United States Patent
Heinrichs

(10) Patent No.: US 9,651,031 B2
(45) Date of Patent: May 16, 2017

(54) RESERVOIR TEMPERATURE DIFFERENTIAL ELECTRICAL GENERATOR

(75) Inventor: Art Heinrichs, Calgary (CA)

(73) Assignee: Art Heinrichs, Calgary, Alberta ( * ) Notice: Subject to any disclaimer, the term of this patent is extended or adjusted under 35 U.S.C. 154(b) by 383 days.

(21) Appl. No.: 14/395,290

(22) PCT Filed: Jun. 13, 2012

(86) PCT No.: PCT/CA2012/050396
§ 371 (c)(1),
(2), (4) Date: Oct. 17, 2014

(87) PCT Pub. No.: WO2012/171122
PCT Pub. Date: Dec. 20, 2012

(65) Prior Publication Data
US 2015/0076830 A1    Mar. 19, 2015

(51) Int. Cl.
*F03G 7/04* (2006.01)
*F03G 6/00* (2006.01)

(52) U.S. Cl.
CPC ............... *F03G 7/04* (2013.01); *F03G 6/00* (2013.01); *Y02E 10/46* (2013.01)

(58) Field of Classification Search
CPC . F03G 6/00; F03G 6/003; F03G 6/065; F03G 7/04; F03G 7/05; Y02E 10/34
USPC ......... 60/641.6, 641.7, 641.8, 652, 670, 671
See application file for complete search history.

(56) References Cited

U.S. PATENT DOCUMENTS

| 4,306,416 A | * | 12/1981 | Iozzi | ..................... F01K 27/005 60/641.11 |
| 4,456,056 A | * | 6/1984 | Sills | ..................... F24F 5/0017 165/104.11 |

FOREIGN PATENT DOCUMENTS

DE    4000240 A1 *  7/1991  ............... F03G 7/04

* cited by examiner

*Primary Examiner* — Mark Laurenzi
*Assistant Examiner* — Mickey France
(74) *Attorney, Agent, or Firm* — Williams Intellectual Property; Benjamin F. Williams

(57) ABSTRACT

A reservoir temperature differential generator is partially submergible in a water body and a temperature differential is sensible between each of a first end, disposed above the water-air interface, and a second end submerged beneath the water surface. A volatile working fluid having a low boiling point is circulated between each of a first and second heat exchanger to effect phase change and drive a heat engine for generation of electrical energy. A plurality of sensors is included to monitor real-time environmental conditions, and thus direct a fluid circuit between a sensed maximum temperature and a sensed minimum temperature. The fluid circuit, maintained interior to the present device, is forcibly reversible between each of the first and second heat exchangers to maintain phase change of the working fluid across a maximized temperature differential in response to changing environmental conditions.

14 Claims, 6 Drawing Sheets

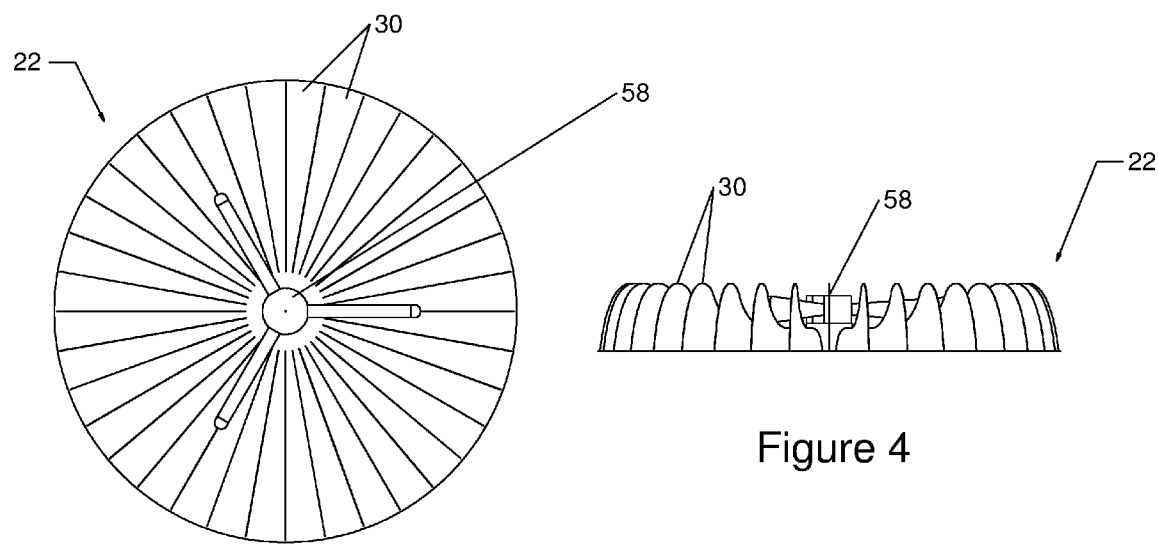
Figure 3
Figure 4
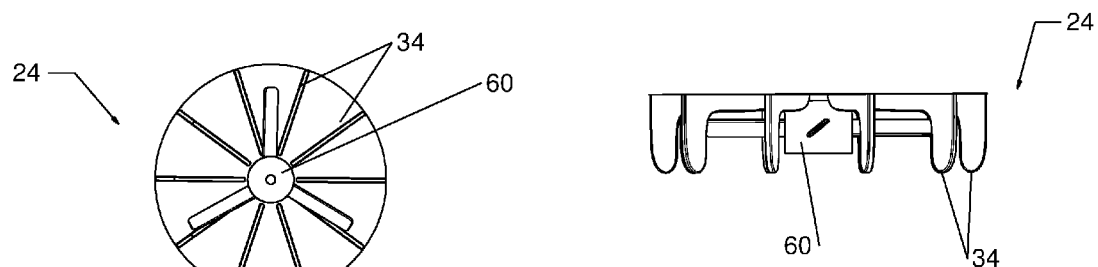
Figure 5
Figure 6

Figure 8
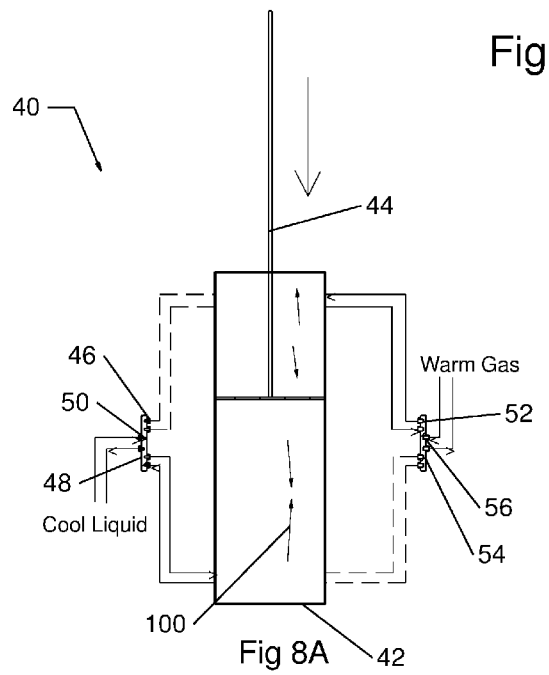
Fig 8A
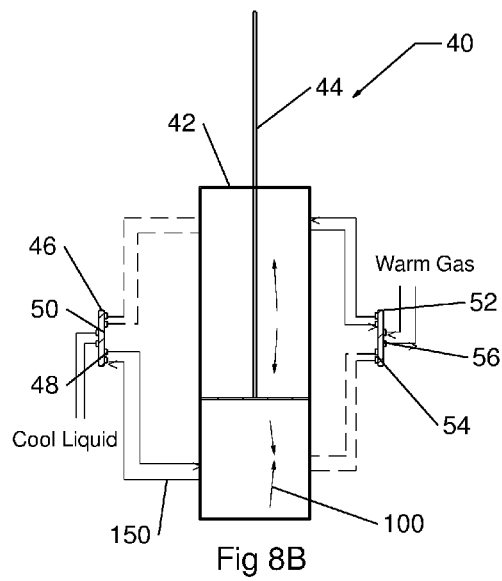
Fig 8B
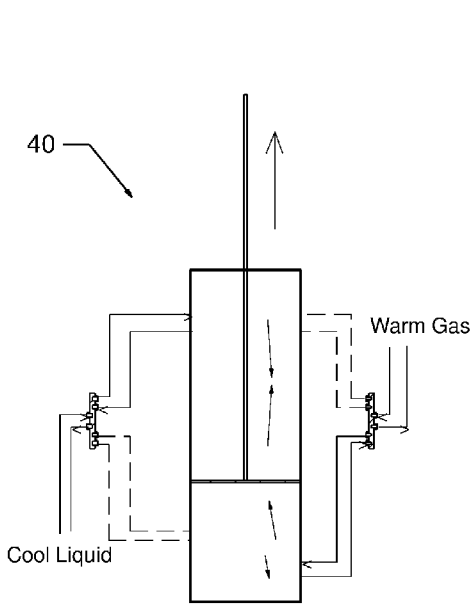
Fig 8C
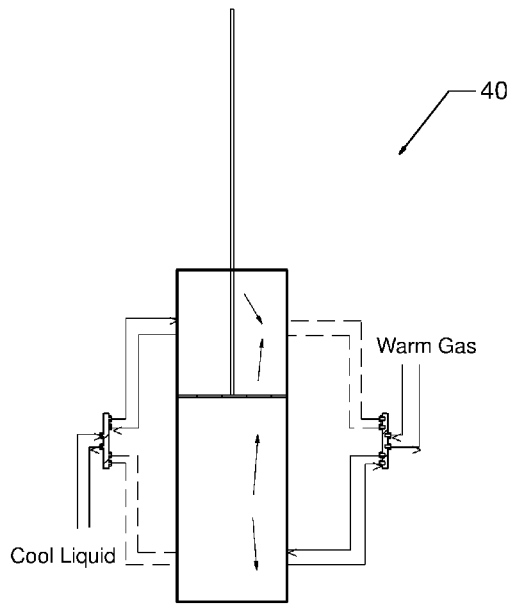
Fig 8D

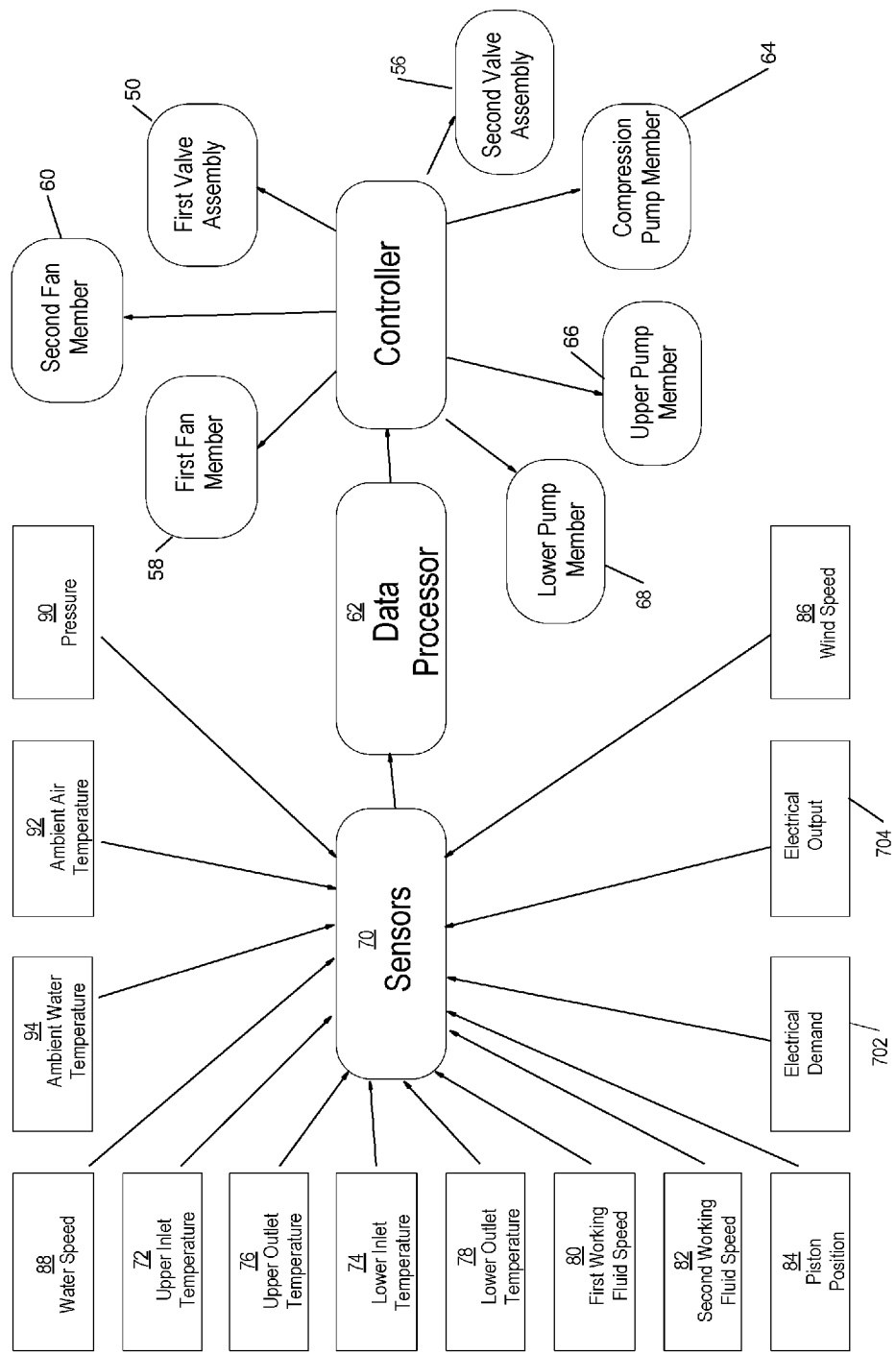

RESERVOIR TEMPERATURE DIFFERENTIAL ELECTRICAL GENERATOR

BACKGROUND OF THE INVENTION

Phase change of volatile liquids across small temperature gradients is used in the Organic Rankine Cycle to generate electricity in geothermal and other applications. Use of a relative high temperature body versus a relative low temperature body enables transfer of thermal energy from the relative high temperature body to the relative low temperature body by action of a circulating fluid. Phase change of the fluid from liquid to gaseous phase at the relative high temperature body results in adiabatic expansion, whereby work is performable by the fluid before re-condensation at the relative low temperature body. Cycling of the fluid across this thermal differential therefore enables repeated phase change and further work performable by the fluid to generate electricity.

The present invention makes use of a volatile working fluid having a low boiling point. The working fluid is forcible through a fluid circuit internal to an impermeable housing wherein phase change is effective at temperatures typical in the natural world. By partial submergence in a water body, the device is adapted to maintain a fluid circuit between each of a first heat exchanger, maintained above the air-water interface, and a second heat exchanger, submerged at a depth within the water body. The temperature differential extant between the water body and the ambient atmosphere above the air-water interface thus enables continual transfer of thermal energy usable to drive a heat engine integral with the device. Due to diurnal, nocturnal, and seasonal temperature cycles, wherein the temperature of the water body is alternately colder and warmer than the atmosphere, a plurality of sensors is included to control and reverse the direction of the fluid circuit, and optimize production of electricity from mechanical action driven at the heat engine.

FIELD OF THE INVENTION

The present invention relates to renewable energy devices, and particularly to devices devised to circulate a working fluid having a low boiling point through a Rankine Cycle whereby phase change effected by the working fluid along a temperature gradient performs work to generate electrical energy. The present invention is adapted for use in water bodies, at an air-water interface, whereat a temperature differential is sustained by natural conditions.

A reservoir temperature differential electrical generator has an impermeable housing devised to be partially submerged in a water body whereby a postively buoyant first end is maintained above a water surface and a negatively buoyant second end is maintained submerged at a depth delimited by an elongate portion of the impermeable housing. A first heat exchanger is disposed at the first end, configured to effect efficient heat transfer between the atmosphere and the working fluid, when the working fluid is forced through a fluid circuit disposed interior to the impermeable housing. A second heat exchanger is disposed at the second end, configured to effect efficient heat transfer between the water body and the working fluid forced through the fluid circuit.

A plurality of sensors is disposed sensible of environmental conditions relative to the device, and, by action of a preprogrammed data processor, the fluid circuit is drivable in reversible directions through the heat engine to drive a piston rod between an upper extremity and a lower extremity to generate electrical energy at a generator. Further, a compression chamber is included, integral with the fluid circuit, wherein action of a moveable barrier enables volumetric alteration to alternately pressurize and depressurize the working fluid in the fluid circuit whereby the boiling point of the working fluid is increasable or decreasable in response to sensed environmental conditions proximal the device.

SUMMARY OF THE INVENTION

The present reservoir temperature differential electrical generator has been devised to enable generation of electrical energy from a temperature differential extant across an air-water interface. Air, being gaseous, heats and cools faster than liquid water. Water thus exhibits thermal inertia relative a body of air, whereby a temperature differential is normally present across any air-water interface.

The present invention, therefore, uses an Organic Rankine Cycle, or circulation of another volatile working fluid having a low boiling point, to effect a phase change of said working fluid across a temperature differential extant at an air-water interface, and thereby drive a heat engine. The phrase "low boiling point", as used herein, is taken to mean a boiling point between a range of 4° C. and 40° C. whereby boiling of the working fluid is effective in liquid water under normal conditions. It should be evident to any person having ordinary skill in the art that the present invention may be adapted for use with a plurality of working fluids that exhibit boiling points appropriate for the climatic zone in which use of the present device may be preferred. The range of 4° C. to 40° C., then, is not meant to be limiting, but exemplary.

The present reservoir temperature differential electrical generator, therefore, includes an impermeable housing that is partially submergible in a body of water, whereby a positively buoyant first end is maintained above a water surface and a negatively buoyant second end is maintained submerged to a depth delimited by an elongate portion of the impermeable body. A first heat exchanger is disposed at the first end, and thus disposed in thermal communication with the atmosphere above the water surface, and a second heat exchanger is disposed at the second end, and thus disposed in thermal communication with the water body. A temperature differential, resultant from the difference in temperatures between the water and the atmosphere, is thereby maintainable between each of the first and second heat exchangers at each of the respective first and second ends.

A volatile working fluid having a low boiling point is forcible through a fluid circuit interior to the impermeable housing. The working fluid is thus forcible through the first and second heat exchangers for heat exchange with the air and water body respectively. Phase change of the working fluid is thus effective at a relative high temperature realized at one of the first or second heat exchanges, whereby expansion of the working fluid is effective to drive a heat engine disposed in communication with the fluid circuit. A relative low temperature, at the other of the first and second heat exchangers, thence effects condensation of the working fluid to the liquid phase for recirculation thereafter. Heat is thus transferable by action of the working fluid between the water body and the atmosphere, whereby the heat engine is drivable by phase change effecting the working fluid in conducting thermal energy between each of the first and second heat exchangers.

A first valve assembly and a second valve assembly are disposed to regulate the fluid circuit to cycle the working fluid between each of the first and second heat exchangers in reversible direction, depending on which of the first and second heat exchangers is presently determined to be heating or cooling. Thus natural temperature cycles as occur in the diurnal, nocturnal, and seasonal cycles, for example, act to maintain continuation of the fluid circuit interior to the device as the water body is selectively warmer or colder than the ambient atmosphere above the air-water interface.

A compression chamber is included interior to the impermeable housing wherein the working fluid is housed in communication with the fluid circuit. The compression chamber includes a moveable barrier movable between a maximal position and a minimal position wherein the volume of the compression chamber is alterable between a maximum volume and a minimum volume. Movement of the moveable barrier is thus effective to pressurize and alternately depressurize the working fluid within the fluid circuit whereby the boiling point of the working fluid is alterable between a range of temperatures and pressures. The moveable barrier is drivable by action of a compression pump member forcibly introducing, and alternately evacuating, water between the water body and the interior of the impermeable housing whereby hydraulic force enables movement of the moveable barrier between the maximal and minimal positions. Thus on particularly hot days, for example, when condensing the working fluid would otherwise be impossible, the pressure in the fluid circuit can be increased to enable condensation of the fluid at the relative low temperature in the circuit. Moreover, should conditions be too cold to effect phase change to the gaseous phase, depressurization of the fluid circuit by expansion of the compression chamber may be effective to lower the boiling point appropriately.

A plurality of sensors is included disposed to monitor environmental conditions interior and external relative the impermeable housing whereby optimization of the present device is maintainable by action of a data processor disposed in operational communication with the mechanical operations required to drive each of an upper pump member, a lower pump member, the compression pump member, the first valve assembly, the second valve assembly, as well as each of a first fan member and a second fan member disposed to speed air and water across each of the first and second heat exchangers respectively.

The plurality of sensors therefore controls operation of the device in response to sensed environmental conditions, including, for example, sense of an upper intake temperature, a lower intake temperature, an upper outlet temperature, a lower outlet temperature, a first working fluid speed, a second working fluid speed, a piston position, a wind speed, a water speed, an ambient air temperature, and an ambient water temperature, as well as an electrical demand sensed from interconnection with a power grid and an electrical output produced by the device. Thus the device is enabled optimized operation to drive the heat engine and convert mechanical action of a piston rod forced between an upper extremity and a lower extremity into electrical energy by means of a generator.

A plurality of reservoir temperature differential electrical generators, connected together to a local power grid, is therefore contemplated for networked use to produce electricity from any water body.

Thus has been broadly outlined the more important features of the present reservoir temperature differential electrical generator so that the detailed description thereof that follows may be better understood and in order that the present contribution to the art may be better appreciated.

Objects of the present reservoir temperature differential electrical generator, along with various novel features that characterize the invention are particularly pointed out in the claims forming a part of this disclosure. For better understanding of the reservoir temperature differential electrical generator, its operating advantages and specific objects attained by its uses, refer to the accompanying drawings and description.

BRIEF DESCRIPTION OF THE DRAWINGS

Figures

FIG. 3 is a top view of an example embodiment of a first end.

FIG. 4 is a side view of an example embodiment of a first end.

FIG. 5 is an end on view of an example embodiment of a second end.

FIG. 6 is a side view of an example embodiment of a second end.

FIGS. 8A through 8D are diagrammatic views of an example embodiment of a heat engine switching a fluid circuit in alternating directions to drive a heat engine in across a temperature differential realized between each of a first and second heat exchanger.

FIG. 9 is a block diagram view of a plurality of sensors sensing various environmental conditions to communicate data to a data processor used to control operation of the device.

DETAILED DESCRIPTION OF THE DRAWINGS

Figure 1:
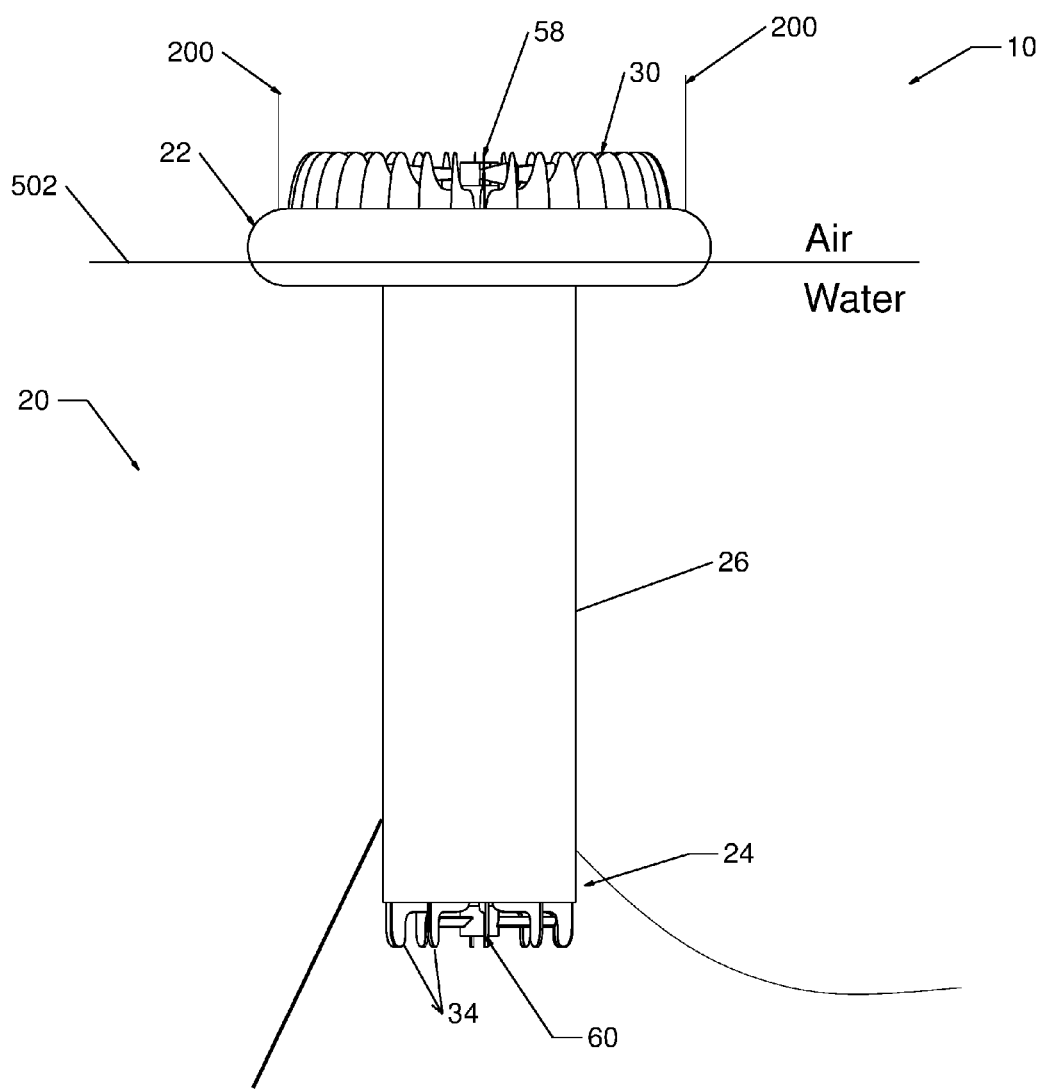
FIG. 1 is a front view of an example embodiment of the device.

With reference now to the drawings, and in particular FIGS. 1 through 9 thereof, example of the instant reservoir temperature differential electrical generator employing the principles and concepts of the present reservoir temperature differential electrical generator and generally designated by the reference number 10 will be described.

Referring to FIGS. 1 through 9 a preferred embodiment of the present reservoir temperature differential electrical generator 10 is illustrated.

The present reservoir temperature differential generator 10 has been devised to generate electricity by action of an Organic Rankine Cycle across a temperature differential sensible between a water body 500 and an atmosphere. The present reservoir temperature differential generator 10, therefore, is partially submergible in a water body 500 whereby a temperature differential is sensible between each of a first end 22, disposed above the water-air interface, and a second end 24, submerged beneath the water surface 502 (see FIG. 1). A volatile working fluid 100 having a low boiling point is circulated between each of a first and second heat exchanger 28, 32 to effect phase change and drive a heat engine 40 for generation of electrical energy. The present device 10 includes a plurality of sensors 70 disposed to monitor real-time environmental conditions, and thus direct a fluid circuit 150 between a sensed maximum temperature and a sensed minimum temperature. Since changing environmental conditions frequently occur, the water body 500 in which the device 10 is placed will alternately act as a heat source and alternately a heat sink relative the immediately proximal ambient atmosphere. The fluid circuit 150 maintained interior to the present device 10, therefore, is forcibly reversible between each of the first and second heat exchangers 28, 32 to maintain phase change of the working fluid 100 across a maximized temperature differential (see FIG. 7).

The reservoir temperature differential electrical generator 10, therefore, includes an impermeable housing 20 disposed for partial submergence in a water body 500. The impermeable housing 20 includes a positively buoyant first end 22 and a negatively buoyant second end 24. The impermeable housing 20 is therefore devised to displace a volume of water equivalent to at most the weight of the impermeable housing 20 whereby the first end 22 of the impermeable housing 20 is maintained above a water surface 502 and the second end 24 is disposed submerged. Illuminable members 200 may be disposed elevated above the first end 22 to demark the device 10 to passersby. An elongate portion 26 is disposed between the first end 22 and the second end 24 whereby the second end 24 is maintained at a depth below the water surface 502.

A first heat exchanger 28 is disposed at the first end 22. The first heat exchanger 28 includes a plurality of fin members 30 having a high surface area to volume ratio. Each of the plurality of fin members 30 is configured to conduct heat into and out of the ambient atmosphere above a surface of the water body 502 whereby an internal temperature interior to the first heat exchanger 28 is equalized at a temperature of the ambient atmosphere. Thus heat is exchanged at the first heat exchanger 28, either into, or alternately out of, the working fluid 100 forcibly traveling therethrough.

A second heat exchanger 32 is disposed at the second end 24 submerged beneath the water surface 502. The second heat exchanger 32 also includes a plurality of fin members 34 configured to conduct heat into and out of the water body 500, said second heat exchanger 30 thereby maintaining an internal temperature equalized at a temperature of the water body 500. Thus heat is conductible into and out of the working fluid 100 when said working fluid 100 is forcibly traveled through the second heat exchanger 32.

A compression chamber 36 is disposed interior to the elongate portion 26 in open communication with the fluid circuit 150. The compression chamber 36 serves as a reservoir for the working fluid 100 and includes a moveable barrier 38 securable between a maximal position and a minimal position to alter the volume of the compression chamber 36 between a maximum volume and a minimum volume respectively. The resulting volume change of the compression chamber 36 effects pressurization and alternately depressurization of the working fluid 100 within the fluid circuit 150 and thus acts to increase or decrease the boiling point of the working fluid 100 between a maximum boiling point and a minimum boiling point. The moveable barrier 38 may by hydraulically driven by action of a compression pump member 64 disposed to introduce water forcibly into the elongate portion 26 to compress the moveable barrier 38 between the maximal position and the minimal position whereby a range of pressures is enabled to drive the boiling point of the working fluid 100 between a determinate temperature range in response to ambient and external environmental conditions such as are caused by the vicissitudes of the seasons, diurnal and nocturnal cycles, as well as localized weather conditions, sensible by a plurality of sensors 70 disposed to control optimized action of the device 10, as will be described subsequently (see FIG. 9).

The heat engine 40 is disposed in open communication with the fluid circuit 150 whereby circulation of the working fluid 100 between each of the first and second heat exchangers 28, 32 is effective to drive the heat engine 40. The heat engine 40 includes a cylinder 42 disposed in fluid communication with the compression chamber 36 and a piston rod 44 moveably disposed inside the cylinder 42, said piston rod 44 moveable between an upper extremity and a lower extremity delimited within the cylinder 42. An upper intake 46 is disposed on one side of the cylinder 42 disposed in open communication with the first heat exchanger 28. Working fluid 100 is introducible into the cylinder 42 by way of the first heat exchanger 28 through the upper intake 46. A lower intake 48 is likewise disposed on the same side of the cylinder 42 as the upper intake 46, said lower intake 48 disposed in open communication with the second heat exchanger 32 whereby the working fluid 100 is likewise introducible into the cylinder 42 from the lower intake 48 by way of the second heat exchanger 32. Thus, depending on the internal temperatures of each of the first and second heat exchangers 28, 32, and the maximized temperature differential between said internal temperatures, working fluid 100 is selectively introducible into the cylinder 42 by way of either the upper or lower intake 46, 48, controllable by action of a first valve assembly 50 there disposed to switch the direction of the fluid circuit 150 as necessary depending on external environmental conditions.

An upper outlet 52 is disposed on the other side of the cylinder 42 in open communication with the first heat exchanger 28. Thus working fluid 100 is selectively routable out of the cylinder 42 toward the first heat exchanger 28 by means of the upper outlet 52. A lower outlet 54 is likewise disposed on the same side of the cylinder 42 as the upper outlet 52, said lower outlet 54 disposed in open communication with the second heat exchanger 32 whereby the working fluid 100 is selectively routable from the cylinder 42 towards the second heat exchanger 32. A second valve assembly 56, working in concert with the first valve assembly 50, controls the direction of the fluid circuit 150 whereby the working fluid 100 is directable to either the first or second heat exchangers 28, 32 when exiting the cylinder 42 in response to sensed environmental conditions (see FIGS. 8A through 8D).

Thus, for example, during the evening, when the water temperature exceeds the ambient air temperature, the working fluid 100 is forced through the second heat exchanger 32 to effect a phase change to the gaseous phase whereby expansion of the working fluid 100 forces the working fluid 100 by way of the lower intake 48 to raise the piston rod 44 to the upper extremity whereby the working fluid 100 is caused to exit the cylinder 42 at the upper outlet 52 for circulation at the first heat exchanger 28 where the working fluid 100 is cooled by conduction of heat into the ambient atmosphere to condense to the liquid phase before being forced back to the second heat exchanger 32 for reheating. During the morning, when the ambient temperature of the atmosphere (or action of direct sunlight incident the plurality of fin members 30) heats the first end 22, the cycle is reversed, with the working fluid 100 heated at the first heat exchanger 28 and cooled at the second heat exchanger 32. Should the heating at the first heat exchanger 28 exceed some preprogrammed threshold temperature, the compression chamber 36 volume may be reduced to compress the working fluid 100 and thus increase its boiling point. Conversely, should the heating potential at either the first or second end 22, 24 diminish below a preprogrammed threshold, then the compression chamber 36 may be depressurized to lower the boiling point of the working fluid 100. Thus the present device 10 is optimized and workable across a variety of changing environmental conditions to circulate the working fluid 100 across a maximized temperature differential.

To further increase maximization of the temperature differential between the first and second heat exchangers 28, 32 a first fan member 58 is disposed atop the first end 22 and a second fan member 60 is disposed posteriorly upon the second end 24. Each of the first and second fan members 58, 60 is independently operable to speed air or water respectively across the respective plurality of fin members 30, 34 and thus speed heat exchange thereat. Each of the first and second fan members 58, 60 is independently operable and controllable by action of a data processor 62 in operational communication with each of said first and second fan members 58, 60 in response to sensed environmental conditions, as will be described subsequently.

To force movement of the moveable barrier 38, and thus alter the volume the compression chamber 36 to alternately pressurize and depressurize the working fluid 100, a compression pump member 64 is disposed to pump water from the water body 500 interior the impermeable housing 20 to effect movement of the moveable barrier 38 towards the maximal position and, conversely, to pump water out of the interior of the impermeable housing 20 into the water body 500 to effect movement of the moveable barrier 38 towards the minimal position. It is contemplated that water, as a non-compressible fluid, engenders hydraulic force enough to alter the boiling point of the working fluid 100 and, conversely, when the water is evacuated from the impermeable housing 20 by action of the compression pump member 64, the pressure in the fluid circuit 150 is rarefied, and the moveable barrier 38 moves towards the minimal position.

An upper pump member 66 is also included operable to force the working fluid 100 between the heat engine 40 and the first heat exchanger 28. A lower pump member 68 is likewise operable to force the working fluid 100 between the heat engine 40 and the second heat exchanger 32.

A plurality of sensors 70 is disposed in operational communication with the data processor 62 actionable to control the device 10 and optimize action across a maximized temperature differential. The plurality of sensors 70 is devised to sense an upper intake temperature 72 sensible at the upper intake 46, a lower intake temperature 74 sensible at the lower intake 48, an upper outlet temperature 76 sensible at the upper outlet 52, a lower outlet temperature 78 sensible at the lower outlet 54, a first working fluid speed 80 sensible at the upper pump member 66, a second working fluid speed 82 sensible at the lower pump member 68, a piston position 84 sensible at the piston rod 44 relative the upper and lower extremity, a wind speed 86 sensible at the first end 22, a water speed 88 sensible at the second end 24, a pressure 90 sensible interior the compression chamber 36, an ambient air temperature 92 sensible at the first end 22, and an ambient water temperature 94 sensible at the second end 24 (see FIG. 9).

The plurality of sensors 70 thus communicates real time environmental conditions whereby the data processor 62 enable optimized control of the device 10 to properly circulate the working fluid 100 between each of the first and second heat exchangers 28, 32 to effect phase change and thus drive the heat engine 40 continuously.

Figure 2:
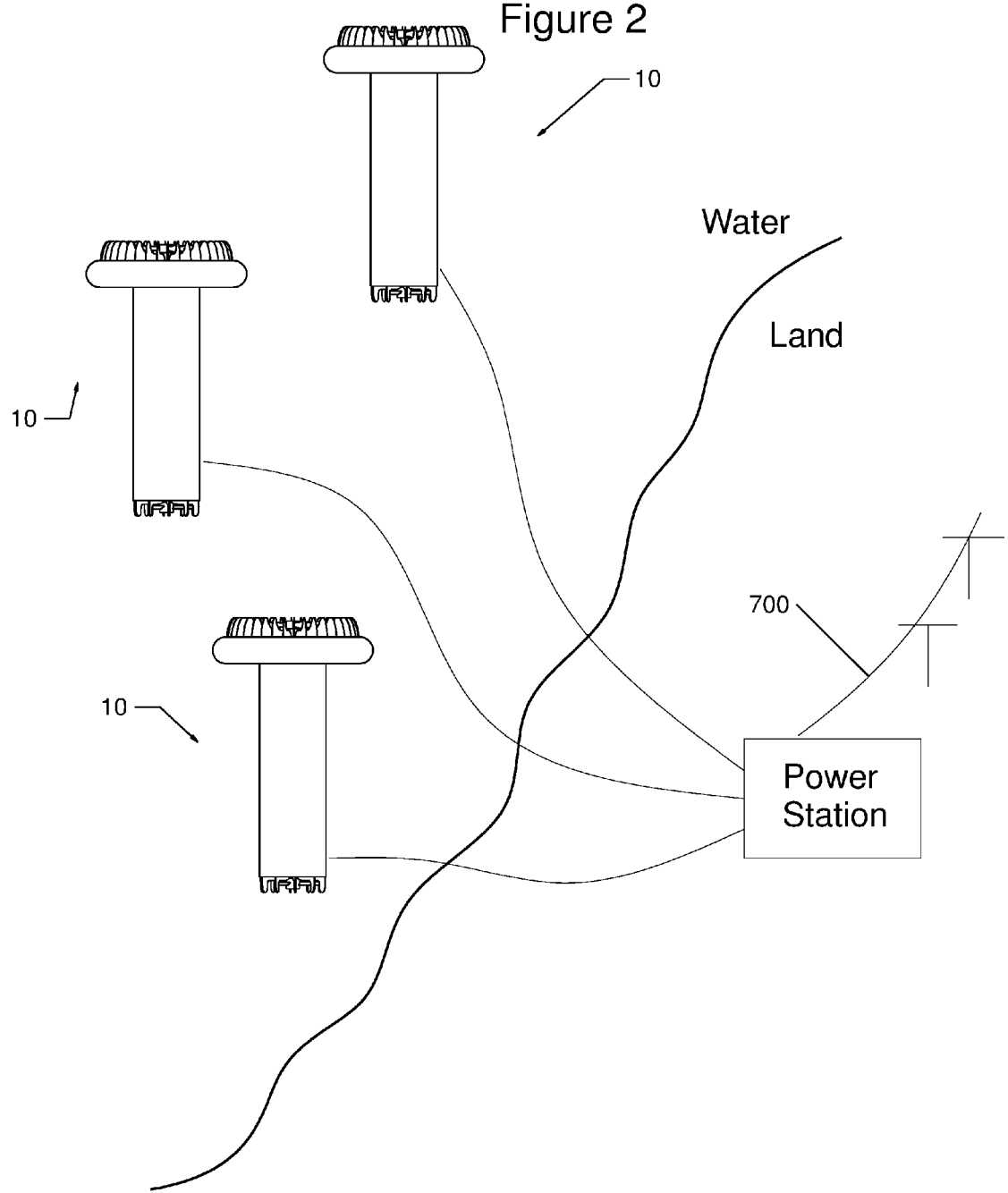
FIG. 2 is a concept view of a network of example embodiments of the device connected to a power grid.
Figure 7:
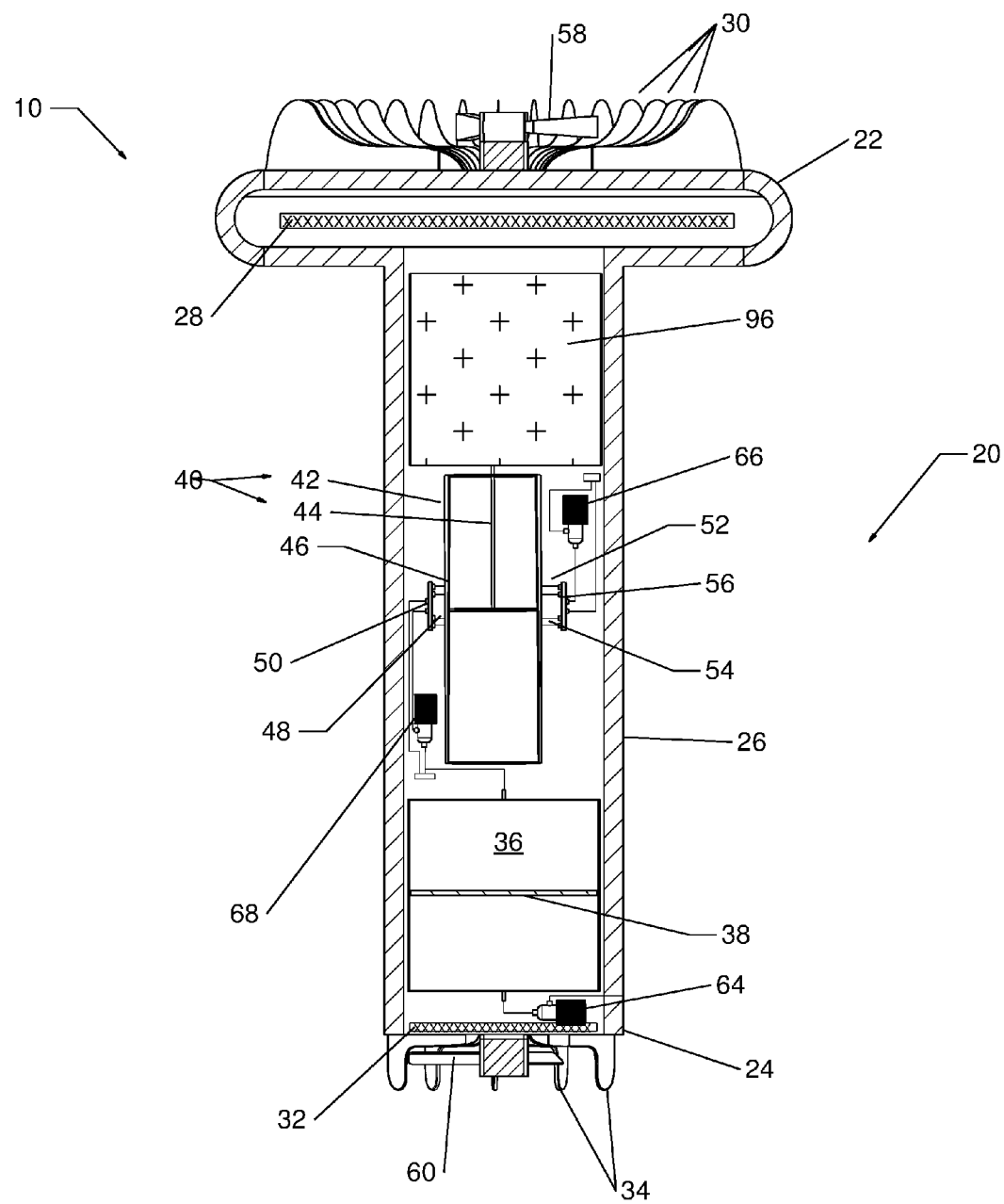
FIG. 7 is a longitudinal cross-section view of an example embodiment detailing the interior workings thereof.

A generator 96 is disposed in operative communication with the piston rod 44, said generator 96 configured to convert mechanical energy into electrical energy. The reservoir temperature differential electrical generator 10 is thus securable within a water body 500 and connectable in circuit with a power gird 700 whereby electrical energy is generable from the temperature differential between the water and the air and put to work. As shown in FIG. 2, a plurality of reservoir temperature differential electrical generators 10 is contemplated connectable together in parallel to generate a sum of electricity deliverable to a grid system, as desired. When operating in connection with a power grid 700, an electrical demand 702 may also be communicable and rendered sensible to the data processor and an electrical output 704 may be sensible at the generator 96 whereby output from the device 10 is monitorable.

Thus any body of water is usable to generate electrical power from the temperature differential extant between the liquid water and the gaseous air.

The invention claimed is:

1. A reservoir temperature differential electrical generator generative of electrical power when positioned partially submerged into a water body, said reservoir temperature differential electrical generator comprising:
    an impermeable housing;
    a positively buoyant first end disposed anteriorly atop the housing;
    a negatively buoyant second end disposed posteriorly endwise upon the housing;
    an elongate portion disposed between said first and second ends;
    a first heat exchanger disposed at the first end;
    a second heat exchanger disposed at the second end;
    a compression chamber disposed interior to the elongate portion, said compression chamber having a moveable barrier securable between a maximal position and a minimal position to thereby alter the volume of the compression chamber between a maximum volume and a minimum volume respectively;
    a heat engine;
    a fluid circuit connecting the first heat exchanger, the second heat exchanger, the compression chamber, and the heat engine, together in fluid communication;
    a working fluid forcible through the fluid circuit, said working fluid effecting phase change between each of a liquid and gaseous phase along a temperature differential measurable between the first heat exchanger and the second heat exchanger; and
    a generator disposed in operative communication with the piston rod, said generator adapting mechanical energy into electrical energy;
    wherein movement of the moveable barrier alters the pressure of the working fluid in the fluid circuit to alter the boiling point of the working fluid responsive to external temperatures, and phase change, effected by the working fluid along a temperature differential measurable between the first and second heat exchangers, effects mechanical action in the heat engine for generation of electrical energy at the generator.

2. The reservoir temperature differential electrical generator of claim 1 wherein the heat engine comprises:
    a cylinder disposed in fluid communication with the compression chamber;
    a piston rod moveably disposed inside the cylinder, said piston rod moveable between an upper extremity and a lower extremity delimited within the cylinder;
    an upper intake disposed on one side of the cylinder, said upper intake disposed in open communication with the first heat exchanger and the heat engine;

a lower intake disposed on the same side of the cylinder as the upper intake, said lower intake disposed in open communication with the second heat exchanger and the heat engine;

an upper outlet disposed on the other side of the cylinder, said upper outlet disposed in open communication with the heat engine and the first heat exchanger; and a lower outlet disposed on the same side of the cylinder as the upper outlet, said lower outlet disposed in open communication with the heat engine and the second heat exchanger;

wherein the working fluid is selectively routable through each of the upper and lower intakes from each of the respective first or second heat exchanger into the cylinder and selectively routable through each of the upper and lower outlets to each respective first or second heat exchanger in oppositional synchrony relative routing from said upper or lower intake to circulate the working fluid between the first and second heat exchangers along a maximized temperature differential.

3. The reservoir temperature differential electrical generator of claim 2 further comprising a plurality of sensors and a data processor, each of said plurality of sensors sensible of environmental conditions wherein the data processor controls circulation of the working fluid between each of the first and second heat exchangers and the heat engine along a maximized temperature differential whereby phase change of the working fluid is effected between each of a liquid phase and a gaseous phase to drive the heat engine.

4. The reservoir temperature differential electrical generator of claim 3 further comprising a first fan member disposed atop the first end, said first fan member operable to speed atmosphere across the plurality of fin members of the first heat exchanger and thereby speed conduction of heat between said first heat exchanger and the atmosphere.

5. The reservoir temperature differential electrical generator of claim 4 further comprising a second fan member disposed posteriorly upon the second end, said second fan member operable to speed water across the plurality of fin members of the second heat exchanger and thereby speed conduction of heat between said second heat exchanger and the water body.

6. A reservoir temperature differential electrical generator generative of electrical power when positioned partially submerged into a water body, said reservoir temperature differential electrical generator comprising:

an impermeable housing;

a positively buoyant first end disposed anteriorly atop the housing;

a negatively buoyant second end disposed posteriorly endwise upon the housing;

an elongate portion disposed between said first and second ends;

a first heat exchanger disposed at the first end, said first heat exchanger including a plurality of fin members disposed to conduct heat into and out of the ambient atmosphere above a surface of the water body, said first heat exchanger maintaining an internal temperature equalized at a temperature of the ambient atmosphere;

a second heat exchanger disposed at the second end, said second heat exchanger including a plurality of fin members disposed to conduct heat into and out of the water body, said second heat exchanger maintaining an internal temperature equalized at a temperature of the water body;

a compression chamber disposed interior to the elongate portion, said compression chamber having a moveable barrier securable between a maximal position and a minimal position to thereby alter the volume of the compression chamber between a maximum volume and a minimum volume respectively;

a heat engine having:
  a cylinder disposed in fluid communication with the compression chamber;
  a piston rod moveably disposed inside the cylinder, said piston rod moveable between an upper extremity and a lower extremity delimited within the cylinder;
  an upper intake disposed on one side of the cylinder, said upper intake disposed in open communication with the first heat exchanger and the heat engine;
  a lower intake disposed on the same side of the cylinder as the upper intake, said lower intake disposed in open communication with the second heat exchanger and the heat engine;
  an upper outlet disposed on the other side of the cylinder, said upper outlet disposed in open communication with the heat engine and the first heat exchanger;
  a lower outlet disposed on the same side of the cylinder as the upper outlet, said lower outlet disposed in open communication with the heat engine and the second heat exchanger;

a fluid circuit connecting the first heat exchanger, the second heat exchanger, the compression chamber, the heat engine, the upper and lower intakes, and the upper and lower outlets together in fluid communication;

a working fluid forcible through the fluid circuit, said working fluid effecting phase change between each of a liquid and gaseous phase along a temperature differential measurable between the first heat exchanger and the second heat exchanger; and a generator disposed in operative communication with the piston rod, said generator adapting mechanical energy into electrical energy;

wherein movement of the moveable barrier alters the pressure of the working fluid in the fluid circuit to alter the boiling point of the working fluid responsive to external temperatures, and phase change, effected by the working fluid along a temperature differential measurable between the first and second heat exchangers, forces the piston rod between the upper extremity and the lower extremity whereby electricity is generable by mechanical action of the piston rod.

7. The reservoir temperature differential electrical generator of claim 6 further comprising a compression pump member disposed to pump water between the water body and interior the impermeable housing to effect movement of the moveable barrier between the maximal and the minimal positions.

8. The reservoir temperature differential electrical generator of claim 7 further comprising an upper pump member and a lower pump member, said upper pump member operable to force the working fluid between the heat engine and the first heat exchanger, said lower pump member operable to force the working fluid between the heat engine and the second heat exchanger.

9. The reservoir temperature differential electrical generator of claim 8 further comprising a first valve assembly disposed at the upper and lower inlets, said first valve assembly disposed to selectively route the working fluid into the cylinder from either the upper inlet or the lower inlet in response to changing environmental conditions.

10. The reservoir temperature differential electrical generator of claim 9 further comprising a second valve assembly disposed at the upper and lower outlets, said second valve assembly disposed to selectively route the working fluid out of the cylinder from either the upper or lower outlets in synchrony with the first valve assembly controlling each of said upper and lower inlets, in response to changing environmental conditions.

11. The reservoir temperature differential electrical generator of claim 10 further comprising a first fan member disposed atop the first end, said first fan member operable to speed atmosphere across the plurality of fin members of the first heat exchanger and thereby speed conduction of heat between said first heat exchanger and the atmosphere.

12. The reservoir temperature differential electrical generator of claim 11 further comprising a second fan member disposed posteriorly upon the second end, said second fan member operable to speed water across the plurality of fin members of the second heat exchanger and thereby speed conduction of heat between said second heat exchanger and the water body.

13. The reservoir temperature differential electrical generator of claim 12 further comprising a plurality of sensors devised to sense:
- an upper intake temperature sensible at the upper intake;
- a lower intake temperature sensible at the lower intake;
- an upper outlet temperature sensible at the upper outlet;
- a lower outlet temperature sensible at the lower outlet;
- a first working fluid speed sensible at the upper pump member;
- a second working fluid speed sensible at the lower pump member;
- a piston position sensible at the piston rod relative the upper and lower extremity;
- a wind speed sensible at the first end;
- a water speed sensible at the second end;
- a pressure sensible interior the compression chamber;
- an ambient air temperature sensible at the first end; and
- an ambient water temperature sensible at the second end;

wherein a data processor operatively connected in circuit with the plurality of sensors controls operation of the first and second fan members, action of each of the compression pump member, upper pump member, and lower pump member, and each of the first and second valve assemblies in response to changing environmental conditions, whereby the working fluid is cycled through the heat engine between a maximized temperature differential.

14. A reservoir temperature differential electrical generator generative of electrical power when positioned partially submerged into a water body, said reservoir temperature differential electrical generator comprising:
- an impermeable housing;
- a positively buoyant first end disposed anteriorly atop the housing;
- a first fan member disposed atop the first end;
- a negatively buoyant second end disposed posteriorly endwise upon the housing;
- a second fan member disposed posteriorly upon the second end;
- an elongate portion disposed between said first and second ends;
- a first heat exchanger disposed at the first end, said first heat exchanger including a plurality of fin members disposed to conduct heat into and out of the ambient atmosphere above a surface of the water body, said first heat exchanger maintaining an internal temperature equalized at a temperature of the ambient atmosphere;
- a second heat exchanger disposed at the second end, said second heat exchanger including a plurality of fin members disposed to conduct heat into and out of the water body, said second heat exchanger maintaining an internal temperature equalized at a temperature of the water body;
- a compression chamber disposed interior to the elongate portion, said compression chamber having a moveable barrier securable between a maximal position and a minimal position to thereby alter the volume of the compression chamber between a maximum volume and a minimum volume respectively;
- a heat engine having:
  - a cylinder disposed in fluid communication with the compression chamber;
  - a piston rod moveably disposed inside the cylinder, said piston rod moveable between an upper extremity and a lower extremity delimited within the cylinder;
  - an upper intake disposed on one side of the cylinder, said upper intake disposed in open communication with the first heat exchanger and the heat engine;
  - a lower intake disposed on the same side of the cylinder as the upper intake, said lower intake disposed in open communication with the second heat exchanger and the heat engine;
  - an upper outlet disposed on the other side of the cylinder, said upper outlet disposed in open communication with the heat engine and the first heat exchanger;
  - a lower outlet disposed on the same side of the cylinder as the upper outlet, said lower outlet disposed in open communication with the heat engine and the second heat exchanger;
- a fluid circuit connecting the first heat exchanger, the second heat exchanger, the compression chamber, the heat engine, the upper and lower intakes, and the upper and lower outlets together in fluid communication;
- a working fluid forcible through the fluid circuit, said working fluid effecting phase change between each of a liquid and gaseous phase along a temperature differential measurable between the first heat exchanger and the second heat exchanger;
- a first valve assembly disposed to control intake of the working fluid into the cylinder, said first valve assembly switching between each of the upper intake and the lower intake to route inflow from either the first or second heat exchanger depending on the internal temperatures sensed at each of said first and second heat exchangers;
- a second valve assembly disposed to control outlet of the working fluid out of the cylinder, said second valve assembly switching between each of the upper outlet and lower outlet to route outflow toward either the first or second heat exchanger depending on the internal temperatures sensed at ach of said first and second heat exchangers;
- a compression pump member disposed to pump water between the water body and interior the impermeable housing to effect movement of the moveable barrier between the maximal and the minimal positions;
- an upper pump member operable to force the working fluid between the heat engine and the first heat exchanger;
- a lower pump member operable to force the working fluid between the heat engine and the second heat exchanger;
- a plurality of sensors disposed to measure:
  - an upper intake temperature sensible at the upper intake;
  - a lower intake temperature sensible at the lower intake;

an upper outlet temperature sensible at the upper outlet;
a lower outlet temperature sensible at the lower outlet;
a first working fluid speed sensible at the upper pump member;
a second working fluid speed sensible at the lower pump member;
a piston position sensible at the piston rod relative the upper and lower extremity;
a wind speed sensible at the first end;
a water speed sensible at the second end;
a pressure sensible interior the compression chamber;
an ambient air temperature sensible at the first end;
an ambient water temperature sensible at the second end;
a data processor disposed in operative communication with each of the plurality of sensors, said data processor controlling action of the first valve assembly, the second valve assembly, the compression pump member, the upper pump member, and the lower pump member, effective to route the working fluid to drive the heat engine by phase change relative a maximized sensed temperature differential measurable between the first and second heat exchangers; and
a generator disposed in operative communication with the piston rod, said generator adapting mechanical energy into electrical energy;
wherein movement of the moveable barrier alters the pressure of the working fluid in the fluid circuit to alter the boiling point of the working fluid responsive to external temperatures sensed by the plurality of sensors, and phase change, effected by the working fluid along a temperature differential measurable between the first and second heat exchangers, forces the piston rod between the upper extremity and the lower extremity whereby electricity is generable by mechanical action of the piston rod.

* * * * *